United States Patent
Khoryaev et al.

(10) Patent No.: US 11,246,114 B2
(45) Date of Patent: Feb. 8, 2022

(54) OPTIMIZED RESOURCE SELECTION PROCEDURES IN VEHICLE-TO-VEHICLE COMMUNICATIONS

(71) Applicant: Apple Inc., Cupertino, CA (US)

(72) Inventors: Alexey Khoryaev, Nizhny Novgorod (RU); Sergey Panteleev, Nizhny Novgorod (RU); Sergey Sosnin, Zavolzhie (RU); Mikhail Shilov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 16/316,744

(22) PCT Filed: Apr. 28, 2017

(86) PCT No.: PCT/US2017/030274
§ 371 (c)(1),
(2) Date: Jan. 10, 2019

(87) PCT Pub. No.: WO2018/031086
PCT Pub. Date: Feb. 15, 2018

(65) Prior Publication Data
US 2021/0160817 A1    May 27, 2021

Related U.S. Application Data

(60) Provisional application No. 62/374,198, filed on Aug. 12, 2016.

(51) Int. Cl.
*H04W 72/02* (2009.01)
*H04W 4/40* (2018.01)
(Continued)

(52) U.S. Cl.
CPC .......... *H04W 72/02* (2013.01); *H04B 17/318* (2015.01); *H04W 4/40* (2018.02);
(Continued)

(58) Field of Classification Search
CPC ... H04W 72/02; H04W 72/0493; H04W 4/40; H04W 4/46; H04W 72/0406;
(Continued)

(56) References Cited

U.S. PATENT DOCUMENTS

2015/0215903 A1    7/2015  Zhao et al.
2015/0382324 A1*  12/2015  Sheng .................. H04W 72/02
                                                                    370/329
(Continued)

OTHER PUBLICATIONS

International Search Report and Written Opinion dated Jul. 31, 2017 for PCT Application PCT/US2017/030274.
(Continued)

*Primary Examiner* — Un C Cho
*Assistant Examiner* — Lalita W Pace
(74) *Attorney, Agent, or Firm* — Eschweiler & Potashnik, LLC

(57) ABSTRACT

Selection of time-frequency resources, for autonomous mode operation of V2V UEs, may be performed based on measurements of power transmitted by other UEs and received sidelink control information (SCI) transmitted by the other UEs. Based on these measurements, the UE may selectively exclude spectrum resources, from the set of possible resources, to obtain a final set of resources from which the UE may select resources to use for transmitting. In some implementations, the exclusion of the resources may be based on an iterative operation in which a power threshold value is incrementally modified until a candidate number of resources are available. Additionally, in some implementations, UE priority assignments may be used to obtain the power threshold value for a particular UE.

22 Claims, 10 Drawing Sheets

(51) Int. Cl.
*H04W 72/10* (2009.01)
*H04B 17/318* (2015.01)
*H04W 72/04* (2009.01)

(52) U.S. Cl.
CPC ... *H04W 72/0406* (2013.01); *H04W 72/0493* (2013.01); *H04W 72/10* (2013.01)

(58) Field of Classification Search
CPC ....... H04W 72/10; H04W 84/18; H04W 4/70; H04W 72/048; H04B 17/318
See application file for complete search history.

(56) References Cited

U.S. PATENT DOCUMENTS

| | | | | |
|---|---|---|---|---|
| 2016/0050676 | A1* | 2/2016 | Sinnaduray | H04L 5/00 370/329 |
| 2016/0374105 | A1* | 12/2016 | Kalhan | H04W 24/08 |
| 2017/0188391 | A1* | 6/2017 | Rajagopal | H04W 74/0816 |
| 2017/0332207 | A1* | 11/2017 | Sheng | H04W 4/027 |
| 2018/0049220 | A1* | 2/2018 | Patil | H04W 72/1247 |
| 2018/0206211 | A1* | 7/2018 | Seo | H04W 72/02 |
| 2019/0116608 | A1* | 4/2019 | Kim | H04W 72/1263 |

OTHER PUBLICATIONS

"List of agreements for Support for V2V services based on LTE sidelink." Source: LG Electronics. Agenda Item: 6.2.2. RAN WG1 Meeting #85, Nanjing, China, May 23-27, 2016. R1-165978. 36 pages.

"Design options to support priority for V2V communication." Source: Intel Corporation. Agenda Item: 7.2.2.2.1. 3GPP TSG RAN WG1 Meeting #86, Gothenburg, Sweden, Aug. 22-26, 2016. R1-167693. 6 pages.

International Preliminary Report on Patentability dated Feb. 12, 2019 for PCT Application PCT/US2017/030274.

* cited by examiner

OPTIMIZED RESOURCE SELECTION PROCEDURES IN VEHICLE-TO-VEHICLE COMMUNICATIONS

RELATED APPLICATIONS

This application is a National Phase entry application of International Patent Application No. PCT/US2017/030274 filed Apr. 28, 2017, which claims priority to U.S. Provisional Patent Application No. 62/374,198, which was filed on Aug. 12, 2016, and is hereby incorporated by reference in its entirety.

BACKGROUND

Vehicle-to-everything (V2X) and Vehicle-to-vehicle (V2V) communications are automobile technologies designed to allow automobiles to communicate with each other and with other devices (e.g., pedestrian smartphones and traffic lights). These technologies have the potential to redefine transportation by providing real-time, highly reliable, and actionable information flows to enable safety, mobility and environmental applications. Additionally, these techniques may pave the way to connected and automated driving (CAD).

Devices participating in a V2V system may need to acquire appropriate resources, such as frequency resources, to communicate with one another. Resource selection can potentially be performed with assistance from a cellular base station or autonomously (e.g., without assistance from a base station). Autonomous mode operation may be necessary as cellular network coverage cannot be guaranteed for all geographic locations through which vehicles may travel. Thus, the ability for vehicles (or other devices) to autonomously implement, in an ad-hoc manner, resource selection (e.g., to appropriately distribute frequency resources to devices in a particular area) can be critical to successful deployment of V2V technologies.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Techniques described herein relate to selection of frequency resources, by User Equipment (UE), for autonomous mode operation of UEs. As described herein, in some implementations, a UE, in a sensing window, may make measurements relating to power transmitted by other UEs and receive sidelink control information (SCI) transmitted by the other UEs. Based on these measurements, the UE may selectively exclude spectrum resources, from the set of possible resources, to obtain a final set of resources from which the UE may select resources to use for transmitting.

In some implementations, the exclusion of the resources may be based on an iterative operation in which a power threshold value is incrementally modified until a candidate number of resources are available. Additionally, in some implementations, UE priority assignments may be used to obtain the power threshold value for a particular UE.

Figure 1:
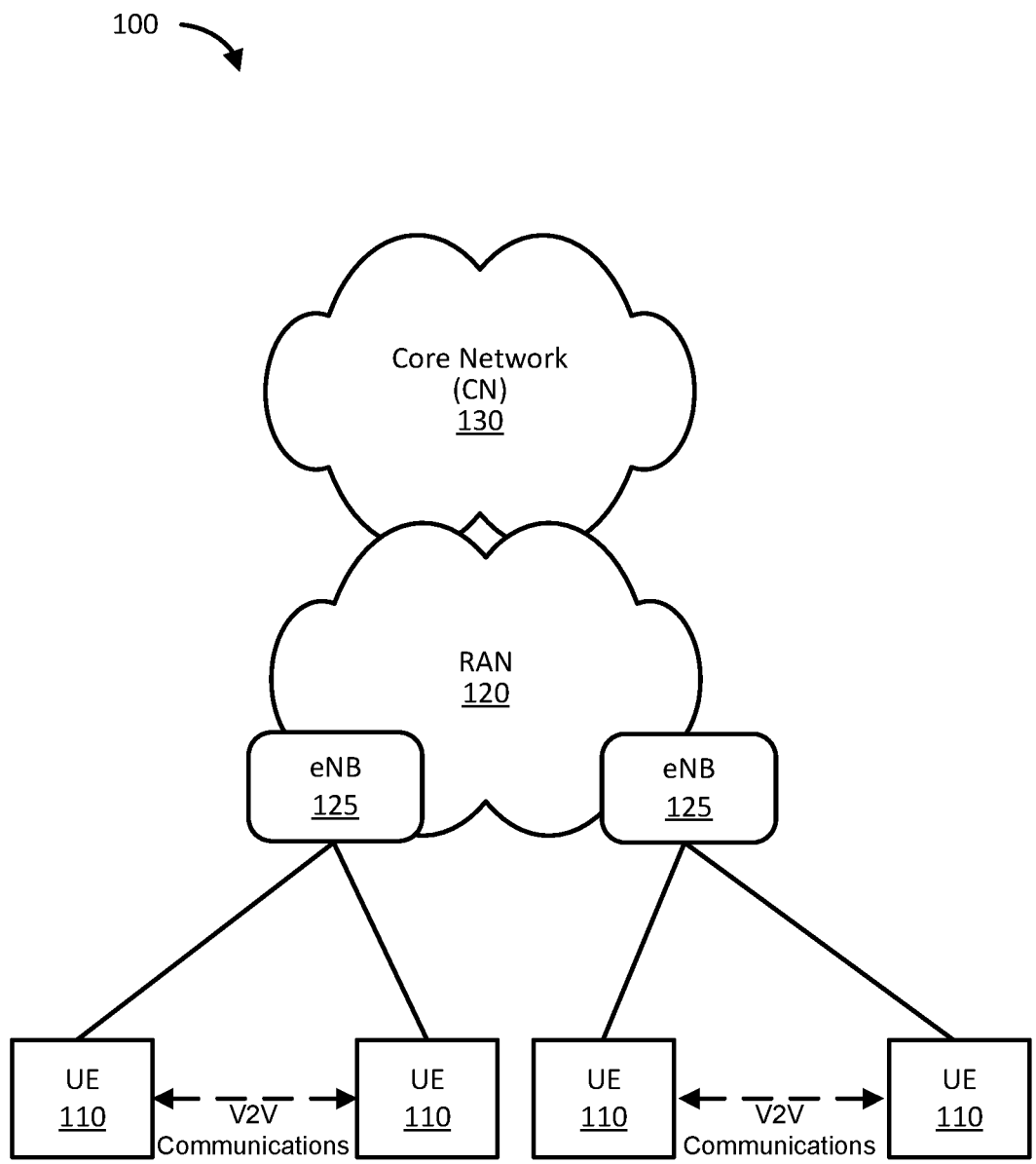
FIG. 1 is a diagram of an example system in which systems and/or methods described herein may be implemented.

FIG. 1 is a diagram of an example system 100 in which systems and/or methods described herein may be implemented. As shown, system 100 may include a telecommunication network that includes a Radio Access Network (RAN) 120 that is connected to a Core Network (CN) 130. RAN 120 and CN 130 may provide network connectivity to UEs 110. RAN 120 may include, for example, one or more 3rd Generation Partnership Project (3GPP) base stations 125, such Long Term Evolution (LTE) evolved NodeBs (eNBs) and/or one or more 3GPP 5$^{th}$Generation (5G) eNBs. Base stations 125 may be generically referred to as eNBs 125 herein. 5G radio resources may sometimes be referred to as 5G New Radio Access Technology (5G NR) resources. Additionally, 5G Device-to-Device (D2D) communications, as described herein, may include UEs communicating directly with one another (e.g., via a D2D connection) using 5G NR resources. When UEs 110 are vehicles, the D2D connections may include V2V connections. Although V2V connections will generally be described herein, the described techniques may be equally applicable to V2X connections.

In some implementations, CN 130 may include multiple CNs, such as a 4G CN (e.g., an Evolved Packet Core (EPC)), a 5G CN (e.g., a CN capable of supporting 5G technologies), an Internet-of-Things (IoT) CN (e.g., a CN dedicated to supporting IoT devices), etc. In some implementations, telecommunication network 100 may include a single CN that is capable of supporting 4G, 5G, and IoT services. A detailed example of the functions and devices that may be included in CN 130 is described below with reference to FIG. 2.

UEs 110 may each include a portable computing and communication device, such as a personal digital assistant (PDA), a smartphone, a cellular phone, a laptop computer with connectivity to the wireless telecommunications network, a tablet computer, etc. UE 110 may also include a computing and communication device that may be worn by a user (also referred to as a wearable device) such as a watch, a fitness band, a necklace, glasses, an eyeglass, a ring, a belt, a headset, or another type of wearable device. As particularly described herein, UE 110 may include a vehicle or a device installed in a vehicle.

As shown in FIG. 1, UEs may communicate directly with one another to implement V2V communications. In some situations, UEs 110 may discover and directly communicate with one another using V2V connections that do not rely on RANs 120. In this situation, UEs 110 may use 4G resources and/or 5G NR resources to establish a connection with other UEs 110 (e.g., in an autonomous mode V2V system).

eNBs 125 may include one or more network devices that receive, processes, and/or transmit traffic destined for and/or received from UE 110 via an air (radio) interface. eNBs 125 may function as an intermediary for information communicated between eNBs 125 and CNs 130. eNBs 125 may implement, for example, 4G or 5G technologies for connecting and providing services to UEs 110. Such connections may utilize 4G or 5G radio resources as defined by the 3GPP Communications Standards.

Figure 2:
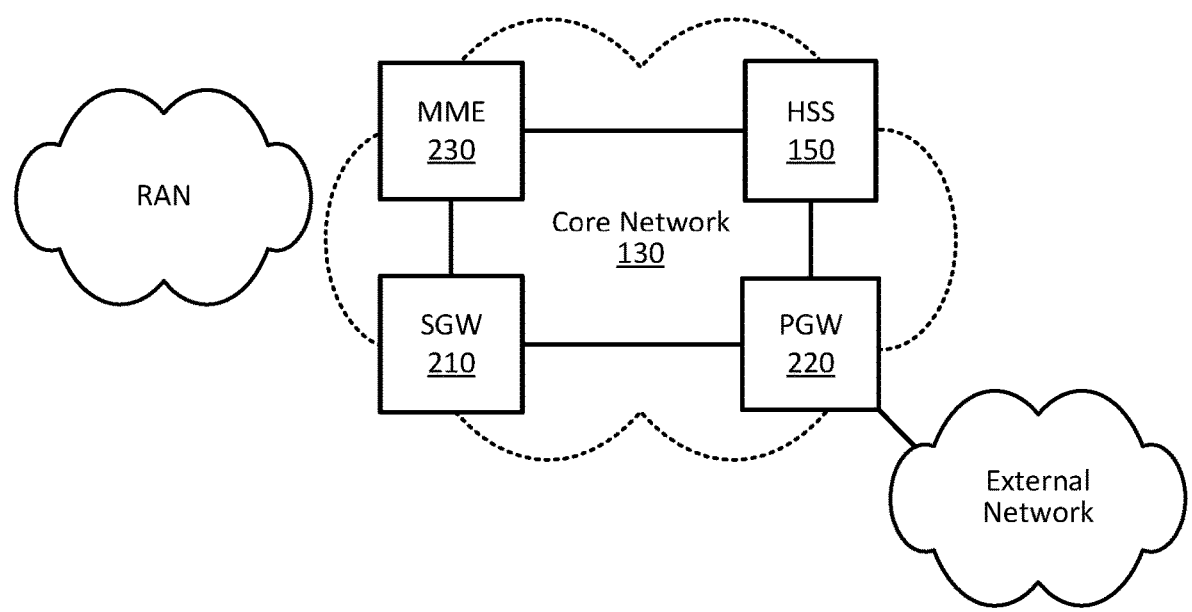
FIG. 2 is a diagram of an example of core network.

FIG. 2 is a diagram of an example of CN 130. CN 130 may include an Evolved Packet Core (EPC) that includes Serving Gateway (SGW) 210, Packet Data Network (PDN) Gateway (PGW) 220, Mobility Management Entity (MME) 230, and Home Subscriber Server (HSS) 240.

SGW 210 may aggregate traffic received from one or more eNBs and may send the aggregated traffic to an external network or device via PGW 220. Additionally, SGW 210 may aggregate traffic received from one or more PGWs 220 and may send the aggregated traffic to one or more eNBs 125. SGW 210 may operate as an anchor for the user plane during inter-eNB handovers and as an anchor for mobility between different telecommunication networks.

PGW 220 may include one or more network devices that may aggregate traffic received from one or more SGWs 210, and may send the aggregated traffic to an external network. PGW 220 may also, or alternatively, receive traffic from the external network and may send the traffic toward UE 110 (via SGW 140 and/or eNBs 125).

MME 230 may include one or more computation and communication devices that act as a control node for eNBs 125, and/or other devices that provide the air interface for the wireless telecommunications network. For example, MME 230 may perform operations to register UEs 110 with the wireless telecommunications network, to establish bearer channels (e.g., traffic flows) associated with a session with UE 110, to hand off UE 110 to a different eNB, MME, or another network, and/or to perform other operations. MME 230 may perform policing operations on traffic destined for and/or received from UE 110.

HSS 240 may include one or more devices that may manage, update, and/or store, in a memory associated with HSS 240, profile information associated with a subscriber (e.g., a subscriber associated with UE 110). The profile information may identify applications and/or services (e.g., D2D services) that are permitted for and/or accessible by the subscriber; a Mobile Directory Number (MDN) associated with the subscriber; bandwidth or data rate thresholds associated with the applications and/or services; and/or other information. The subscriber may be associated with UE 110. Additionally, or alternatively, HSS 240 may perform authentication, authorization, and/or accounting operations associated with the subscriber and/or a communication session with UE 110.

The quantity of devices and/or networks, illustrated in FIGS. 1 and 2, is provided for explanatory purposes only. In practice, there may be additional devices and/or networks; fewer devices and/or networks; different devices and/or networks; or differently arranged devices and/or networks than illustrated in FIGS. 1 and 2. Alternatively, or additionally, one or more of the devices of FIGS. 1 and 2 may perform one or more functions described as being performed by another one or more of the devices of FIGS. 1 and 2. Furthermore, while "direct" connections are shown in FIGS. 1 and 2, these connections should be interpreted as logical communication pathways, and in practice, one or more intervening devices (e.g., routers, gateways, modems, switches, hubs, etc.) may be present.

Figure 3:
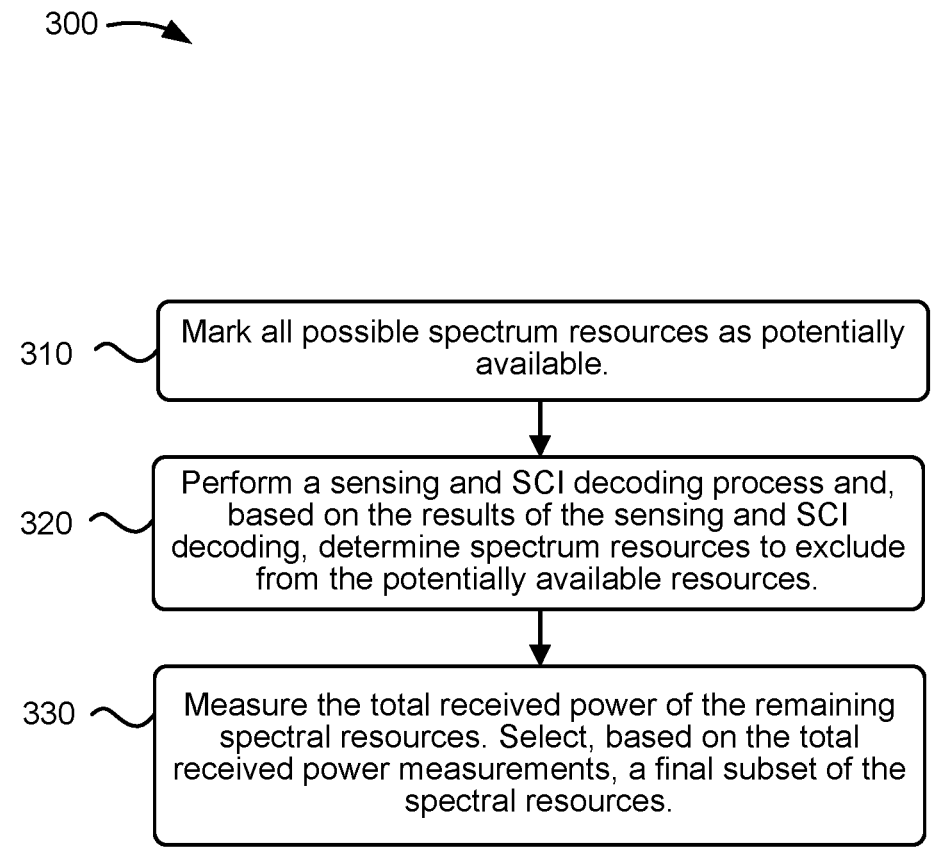
FIG. 3 is a flowchart of an example process relating to resource selection for UEs when operating in an autonomous resource selection mode.

FIG. 3 is a flowchart of an example process 300 relating to resource selection for UEs 110 when operating in autonomous V2V resource selection mode. The term "resource selection," as used herein, may refer to the selection of particular frequency channels or blocks, out of an available frequency spectrum, for communication. Process 300 illustrates, at a high level, a multi-step sensing based resource selection procedure for useable frequency resources for UE 110. Process 300 may be performed by UE 110.

Process 300 may include initially marking all spectrum resources as potentially available (block 310). UE 110 may be preconfigured to or provisioned to use certain spectral resources for V2V communications. For example, for V2V communications, UE 110 may use high frequency radio communications (e.g., near 5.9 GHz) with 10 Mhz channel bandwidths. The marking of all spectrum resources as potentially available may include creating a set or other data structure that includes, as members of the set, all of the spectrum resources that were preconfigured or provisioned, for the UE, as available for V2V communications.

Process 300 may further include performing a sensing and Sidelink Control Information (SCI) decoding process and, based on the results of the sensing and SCI decoding, determine spectrum resources to exclude from the potentially available resources (block 320). The SCI may include control information transmitted by other UEs 110. The sensing may include measuring power and/or energy levels that are received in each of the resources in the set of all possible spectrum resources. For example, transmitter specific Reference Signal Received Power (RSRP) measurements may be measured to determine certain spectrum resources that should be excluded from the previously determined set of potential spectrum resources (block 320). The set of spectrum resources determined in block 310 may thus be reduced.

In one implementation, excluding resources from the set of all possible resources may include comparing the RSRP measurements to thresholds to determine which spectrum resources are not being used. These spectrum resources can thus be excluded from the set possible spectrum resources.

Process 300 may further include measuring the total received power of the remaining spectral resources (block 330). Based on the measurements, a final subset of the spectral resources may be selected for potential use for transmission by the UE (block 330). For instance, the remaining resources may be ranked by received energy levels, in ascending order, and a final subset of the resources selected from the top of the ranking.

Figure 4:
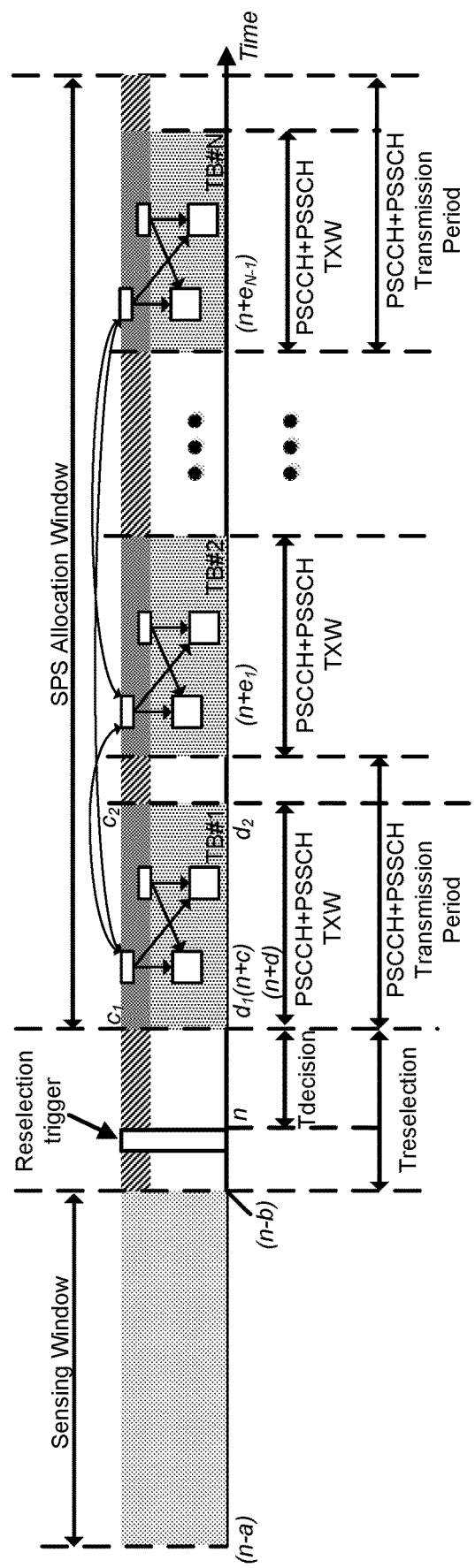
FIG. 4 is a timing diagram illustrating timing relationships for Frequency Division Multiplexing (FDM) resource reselection.

FIG. 4 is a timing diagram illustrating timing relationships for V2V Frequency Division Multiplexing (FDM) resource selection (also called reselection herein). A number of terms relating to resource selection will be described with reference to FIG. 4.

As shown in FIG. 4, a "sensing window" may be defined as a time interval in which UE 110 may monitor SCIs (received from other UEs) and perform measurements, such as received power related measurements. A number of "transmission windows" are also illustrated (as "PSCCH+ PSSCH TXW"). Within a transmission window, a UE may perform resource selection for the transmission of an SCI or a transport block (TB), and transmit the Physical Sidelink Control Channel (PSCCH) and Physical Sidelink Shared Channel (PSSCH) for a given TB. In some implementations, the PSCCH and PSSCH may be transmitted in separate windows, which may be time-aligned or consecutive in time.

A transmission window period parameter may be associated with the transmission window. This parameter may indicate periodicity of the transmission window within a semi-persistent resource allocation (SPS) window for a given semi-persistent scheduling (SPS) process. The transmission window period may be aligned with the periodicity of a TB transmission within a given SPS process. Additionally, as shown in FIG. 4, the period for the SPS resource allocation window may represent the time interval for a particular SPS process, which may cover multiple transmission windows.

A number of timing relationships are also illustrated in FIG. 4. The timing relationships, as shown, correspond to timing relationships for the case of PSCCH and PSSCH transmission in the same subframe. The timing relationships include:
  n—time instance of the resource reselection trigger;
  ((n−a); n−b)—sensing window used for resource reselection corresponding to the trigger at time instance n;
  (n+c)—time instance of SCI (PSCCH) transmission when resource reselection was triggered;
  (n+d)—time instance of data (PSSCH) transmission after resource selection; and
  (n+e)—time instance(s) of data (PSSCH) transmission for other TB(s) e=[e1, e2, e3, . . . ].

As discussed above, in block 320 (FIG. 3), an initial set of potential spectrum resources is reduced to exclude spectrum resources that are occupied by other transmitters. For example, in the sensing window, decoding of the SCI may be performed to determine information about nearby transmitters, such as a priority associated with the transmitter. Additionally, in the sensing window, power measurements, such as the transmitter specific RSRP measurements, may be determined. If the measured power of a particular resource is greater than a threshold, this resource may be excluded from the set of potential spectrum resources. In this manner, collisions can be avoided.

In particular, the following information can be collected from SCI processing within the sensing window: priority of detected transmissions, an indication of the occupied PSCCH and PSSCH resources, and transmitter specific measurements relating to the transmit power for the received PSCCH and PSSCH transmissions. Based on this information, certain resources may be excluded. In one implementation, one class of resources to be excluded may be resources occupied by other UEs in which the received power contribution is above a threshold value. The threshold values may be priority specific. For instance, each transmitter may be associated with a priority level, which may be decoded during the sensing window. Certain priority specific thresholds may be encoded as non-numeric values. For example, +inf may mean that resources occupied by UEs with high priority transmissions should never be used. Conversely, the priority specific threshold setting −inf may mean that all resources corresponding to the priority level can be used for resource selection.

A second class of resources that may be excluded may be resources that are restricted for resource selection based on vehicle geo-location information (geo-based transmission) and fall into the PSSCH transmission window(s).

Figure 5:
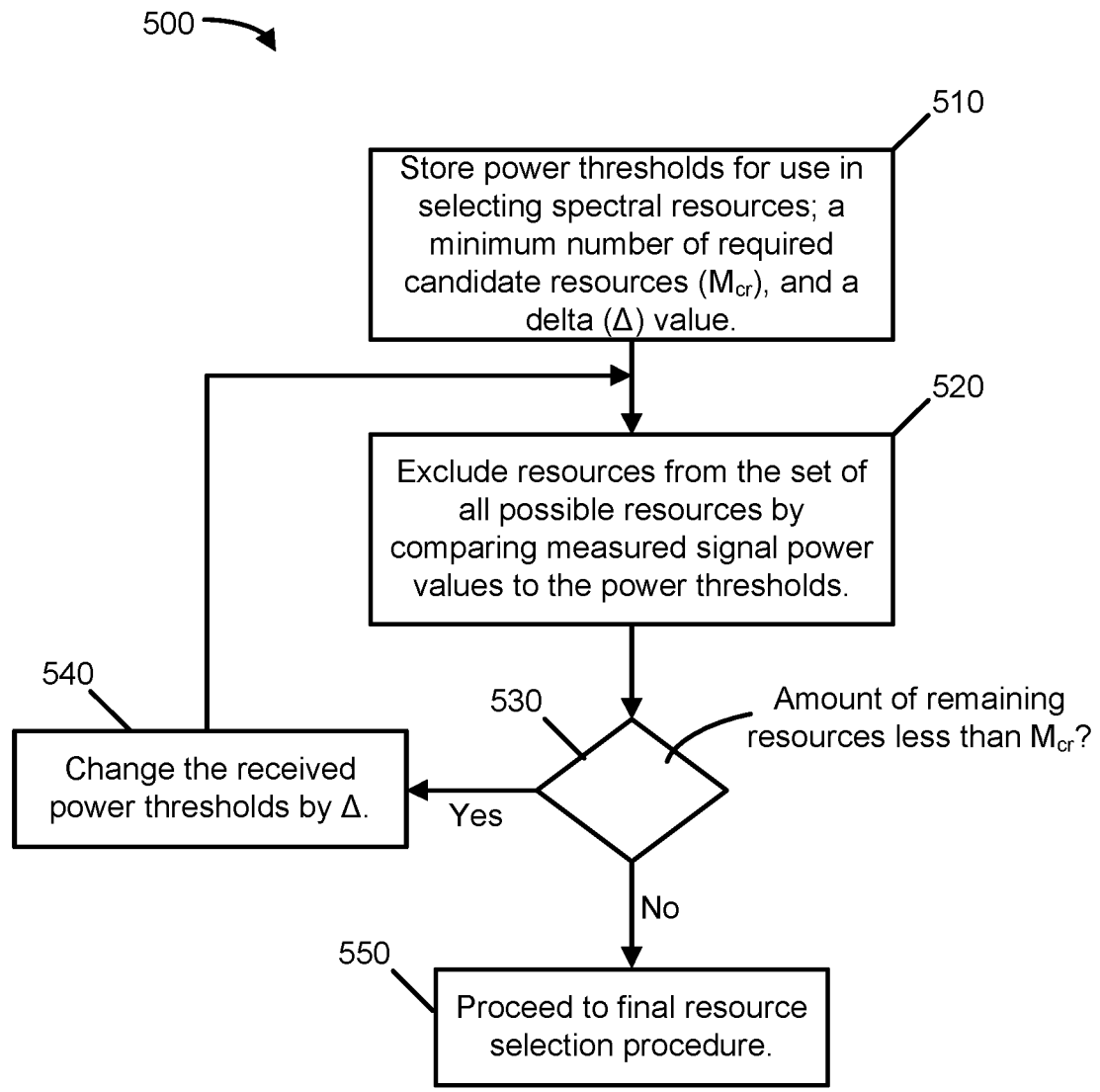
FIG. 5 is a flowchart illustrating an example process for excluding resources.

FIG. 5 is a flowchart illustrating an example process 500 for excluding resources. In process 500, the resources may be excluded in such that the UE may be guaranteed the opportunity to obtain resources for transmitting. Process 500 may be implemented by UE 120. Process 500 may correspond to an implementation of block 320 (FIG. 3).

Process 500 may include storing power threshold values, a value corresponding to a minimum number of required candidate resources ($M_{cr}$), and a delta value (block 510). In one implementation, the values may be configured by telecommunications network 100. Alternatively or additionally, the values may be preconfigured in UE 110, such as during manufacture of UE 110 or during initial provisioning of UE 110.

As previously mentioned, the power threshold values may correspond to a RSRP threshold level at which the signal power produced by other transmitters in the vicinity of UE 110 may indicate that the spectrum resource being used by the other transmitters should be considered to be occupied. Measured power values above the threshold may generally indicate that the corresponding resources are occupied. Different power threshold values may be maintained for different priorities. For example, a first transmitter in the vicinity of the UE (e.g., a transmitter associated with a first vehicle) may be associated with a different priority, and thus a different power threshold value, then a second transmitter, associated with a second vehicle. $M_{cr}$ may be a parameter that indicates the minimum amount of resources that are needed by the UE. For example, a value of $M_{cr}$ of three may indicate that at least three spectrum resource blocks need to be selected. The delta value may describe an amount to potentially increment a power threshold value if too many resources are excluded from the set of possible resources.

Process 500 may further include excluding resources, from the set of all possible resources, by comparing the measured signal power values to the power thresholds (block 520). As discussed previously, if the measured signal power value, for a particular spectrum resource, is above the threshold value, the spectrum resource may be considered to be occupied and may thus be excluded from the set of possible resources. As previously mentioned, the comparison may be made on a priority basis, in which the spectrum resources associated with different transmitters may be performed using different threshold values.

Process 500 may further include determining whether the amount of remaining resources is less than $M_{cr}$ (block 530). If so (block 530—Yes), than insufficient resources are available for the UE, and the power threshold value may be incremented by delta (block 540) and the operations of block 520 may be repeated (block 520). If not (block 530—No), then sufficient resources are available for the UE, and a final resource selection procedure may be performed (block 550). The final resource selection procedure may correspond to block 330 in FIG. 3. In this manner, the exclusion of the resources from the initial set of possible resources may be iteratively performed, with different threshold values, until an acceptable amount of resources are identified.

A number of alternatives are possible to the operations shown in FIG. 5. For example, UE 110 may select the minimum amount of candidate resources based on a ranking procedure of the initial set of resources. For instance, the UE may rank the initial set of resources based on one or more factors, and then select the top $M_{er}$ resources from the ranking. As another alternative, UE 110 may drop packet transmissions and postpone resource reselection to a later time, such as based on a predetermined delay time ("$T_{reselection\_delay}$"). The particular mechanism for dropping of the packets may be controlled by upper layers (e.g., application level layers) of UE 110. As another alternative, UE 110 may randomly select resources for transmission. The random selection may be performed from the set of potential resources in which the corresponding priority of the resource corresponds to the priority of the UE.

As discussed previously, priority information associated with UEs, or with particular resources used by the UEs, may be used to select different power thresholds. In this manner, different levels of radio link quality may be implemented for different priorities. The priority information may be used as part of resource selection or reselection. For instance, it may be desirable to implement higher priority transmissions using resources that provide better radio transmission range, interference protection, and prioritized access to the medium.

The conditions for resource selection may be different for different priority levels and may be configured by higher layer (e.g., application layer) processes. As an exceptional case, it may be desirable to access the medium without regard to the resource selection conditions that are pre-configured for a priority level. For example, in a vehicle crash situation, immediate access to spectrum resources may be desirable.

A number of principles may generally be taken into account when performing priority-based resource selection. These include: (1) a priority specific set of candidate resources may be constructed based on priority specific preconfigured conditions; (2) the priority specific conditions, such as the priority of the UE, may be configured by higher layers, such as the application layer; (3) resource selection from the priority specific candidate resource set may be randomized; and (4) detection of resource collision with higher priority transmission may not trigger immediate resource reselection, however, the collision is taken into account when the next resource reselection is triggered.

Figure 6:
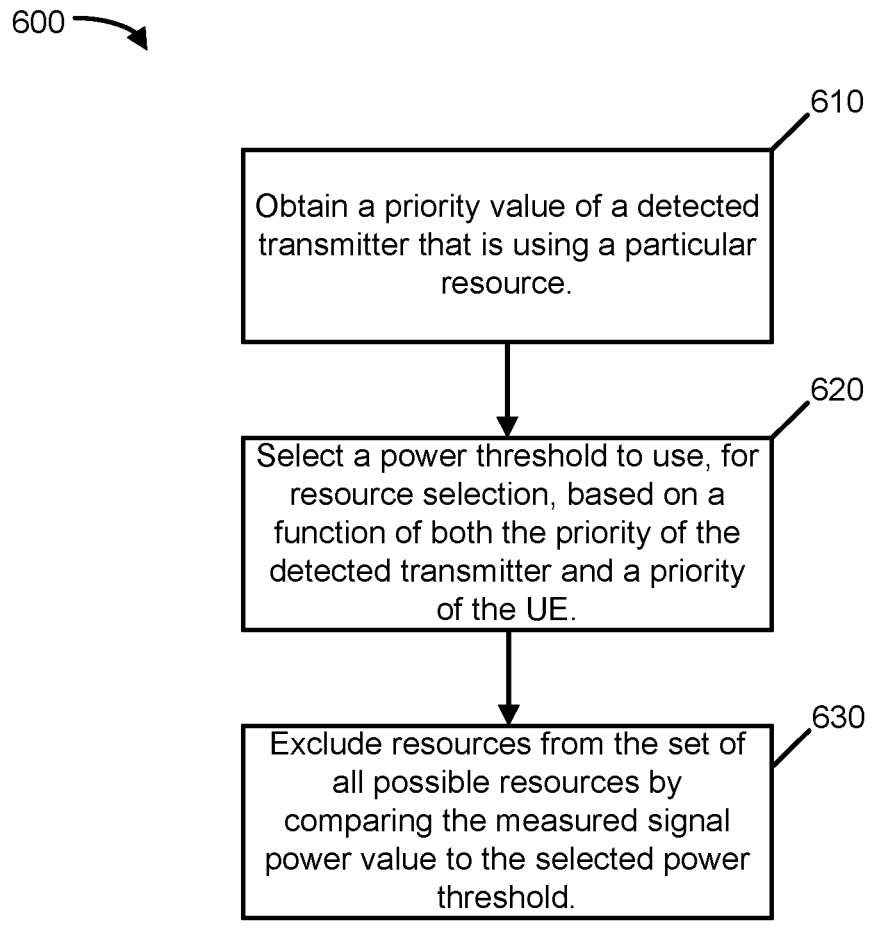
FIG. 6 is a flowchart illustrating an example process for performing priority based resource selection.

FIG. 6 is a flowchart illustrating an example process 600 for performing priority-based resource selection. Process 600 may be implemented by UE 120.

Process 600 may include obtaining a priority value of a transmitter that is using a particular resource (block 610). As previously mentioned, UE 110 may obtain, during the sensing window, priority values of other UEs that are transmitting on V2V frequency resources. The term "transmitter," as used herein, may refer to a UE or to a particular transmitting element of a UE (e.g., a single UE may include multiple transmitters). In some implementations, the priority values may be determined for each detected SPS process that is detected for other UEs.

Process 600 may further include selecting a power threshold to use, for resource selection, based on a function of both a priority of the detected transmitter and the priority of the UE (block 620). As previously mentioned, the power threshold values may be RSRP thresholds that are stored at the UE. The power thresholds values may, for example, be configured by the network, such as via an information element in a System Information Block (SIB).

One example function that may be used to select the power threshold is shown in Table I, below. In Table I, four different priority levels are possible: priority 0 (lowest priority) to priority 3 (highest priority). Additionally, four different configured threshold values are illustrated: Threshold 0 (Thr0), Threshold 1 (Thr1), Threshold 2 (Thr2), and Threshold 3 (Thr3). Thr3 may be less than or equal to Thr2, which may be less than or equal to Thr1, which may be less than or equal to Thr0. In general, as shown in Table I, a higher priority value of the UE that is selecting the resource may result in a higher power threshold value, which will tend to result in fewer resources being excluded from the initial set of potential resources.

TABLE I

| | | Priority of other UEs sharing spectrum resources (Thr3 ≤ Thr2 ≤ Thr1 ≤ Thr0) | | | |
| --- | --- | --- | --- | --- | --- |
| | | Priority 0 (lowest) | Priority 1 | Priority 2 | Priority 3 (highest) |
| UE reselecting resource | Priority 0 | Threshold 0 | Threshold 1 | Threshold 2 | Threshold 3 |
| | Priority 1 | Threshold 1 | Threshold 1 | Threshold 2 | Threshold 3 |
| | Priority 2 | Threshold 2 | Threshold 2 | Threshold 2 | Threshold 3 |
| | Priority 3 | Threshold 3 | Threshold 3 | Threshold 3 | Threshold 3 |

Process 600 may further include excluding resources from the set of all possible resources by comparing measured signal power values to the determined power threshold (block 630). The operations of block 630 may generally correspond to the operations of block 520, in which the power threshold is selected using the operations of blocks 610 and 620. That is, the selected power threshold may be used to exclude resources from the set of possible resource, using either the iterative technique of process 500 (where the initial power threshold value is selected based on a function of both a priority of the detected transmitter and the priority of the UE) or without the iterative process.

In an alternative implementation, instead of selecting the power threshold value based on a function of both a priority of the detected transmitter and the priority of the UE, the power threshold value may be selected without taking into account the priority of the UE that is reselecting the resource. In this implementation, process 600 may be used, except that the selection function of block 620 may be invariant to changes in the priority of UE 110. Table II, below, illustrates an example of such a function.

TABLE II

|  |  | Priority of other UEs sharing spectrum resources (Thr3 ≤ Thr2 ≤ Thr1 ≤ Thr0) | | | |
| --- | --- | --- | --- | --- | --- |
|  |  | Priority 0 (lowest) | Priority 1 | Priority 2 | Priority 3 (highest) |
| UE reselecting resource | Priority 0 | Threshold 0 | Threshold 1 | Threshold 2 | Threshold 3 |
|  | Priority 1 | Threshold 0 | Threshold 1 | Threshold 2 | Threshold 3 |
|  | Priority 2 | Threshold 0 | Threshold 1 | Threshold 2 | Threshold 3 |
|  | Priority 3 | Threshold 0 | Threshold 1 | Threshold 2 | Threshold 3 |

Referring back to FIG. 3, the final set of operations for UE resource selection (block 330), may include selecting the actual resources to use for transmission from the set of resources determined in block 320 (and as further discussed above with reference to FIGS. 5 and 6). Techniques for selecting the actual resources to use for transmission will next be discussed in more detail.

Figure 7:
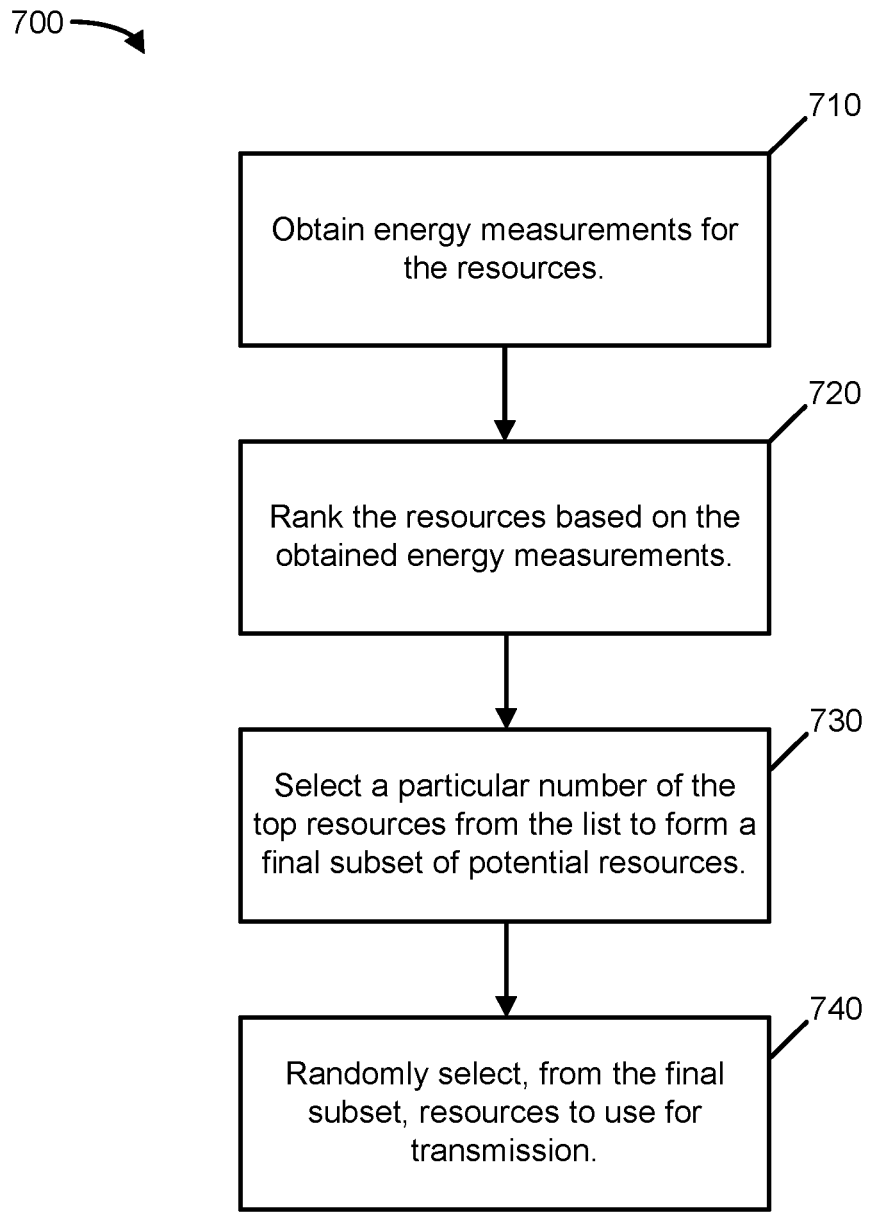
FIG. 7 is a flowchart illustrating an example process for selecting resources to use for transmission.

FIG. 7 is a flowchart illustrating an example process 700 for selecting resources to use for transmission. Process 700 may be implemented by UE 120 and may be performed based on the set of resources determined in block 320.

Process 700 may include obtaining energy measurements, such as measuring received energy or power, for each of the resources (block 710). In one implementation, UE 110 may measure the total received energy corresponding to each spectral resource in the set. The total received energy may be measured using, for example, Radio Frequency (RF) circuitry or front-end module (FEM) circuitry that is implemented by UE 110.

Process 700 may further include ranking resources in the set based on the obtained energy measurements (block 720). In one implementation, the resources may be ranked in ascending order such that the resources, at which UE 110 detects the lowest total energy, are at the top of the ranked list.

Process 700 may further include selecting a particular number of the top resources from the list to form a final subset of potential resources (block 730). For example, UE 110 may use an energy threshold value to select resources from the ranked resources that satisfy the threshold. As another example, UE 110 may select the top $S_{MIN-ENERGY}$ resources (where $S_{MIN-ENERGY}$ is a positive integer) from the ranked list (e.g., the ten resources with the lowest total received energy) to obtain the final subset. Alternatively or additionally, both the threshold value and the selection of the top $S_{MIN-ENERGY}$ resources may be performed to obtain a maximum number ($S_{MIN-ENERGY}$) of potential resources that satisfy the threshold. The particular resources to use for transmission may be randomly selected from the final subset (block 740).

Process 700, as described above, used received energy to determine the final subset of potential resources. In other implementations, other factors could be used. For example, the resources remaining after the operations of block 320 (FIG. 3) may be classified based on one or more of the following:

Total receive energy and co-channel transmissions from other UEs (and potentially also on priority); and/or Total receive energy and inband emission interference from other UEs on a particular resource.

One potential alternative implementation, relative to the implementation shown in process 700, may be performed by additionally using co-channel transmissions information and/or inband emission interference information when determining the final subset of resources. As mentioned with respect to process 700, a threshold may be applied to down-select the subset of resources with a minimum energy level ($S_{MIN-ENERGY}$). If the number of resources in the subset, $S_{MIN-ENERGY}$, is larger than a predefined size of the final subset, $S_{RANDOMIZATION}$, UE 110 may further analyze the subset of resources, $S_{MIN-ENERGY}$, and exclude resources from the set until the size of the set is reduced to the desired size of $S_{RANDOMIZATION}$. In order to reduce $S_{MIN-ENERGY}$, the UE may first exclude resources where it is aware about co-channel transmission (this information can be extracted based on SCI processing including potential priority of co-channel transmission) and may additionally exclude resources corrupted by inband emissions (the presence of which may be determined based on the presence of transmissions in the same subframe but on different frequency resources). In the situation when the size of $S_{MIN-ENERGY}$ is less than the size $M_R$ of the randomization set $S_{RANDOMIZA-TION}$, the UE may select the $M_R$ resources with minimum energy from the whole set of ranked resources $S_{RANKED}$. From the $M_R$ resources, the UE may randomly select resources when needed by the UE.

Vehicle (UE) transmission periodicities will next be discussed.

Vehicle UEs may frequently transmit periodically, and potentially with different periods. Accordingly, it may be desirable for UEs to take into account the periodicity of the other UEs in order to potentially avoid selecting resources that overlap with the transmission of the other UEs.

Figure 8:
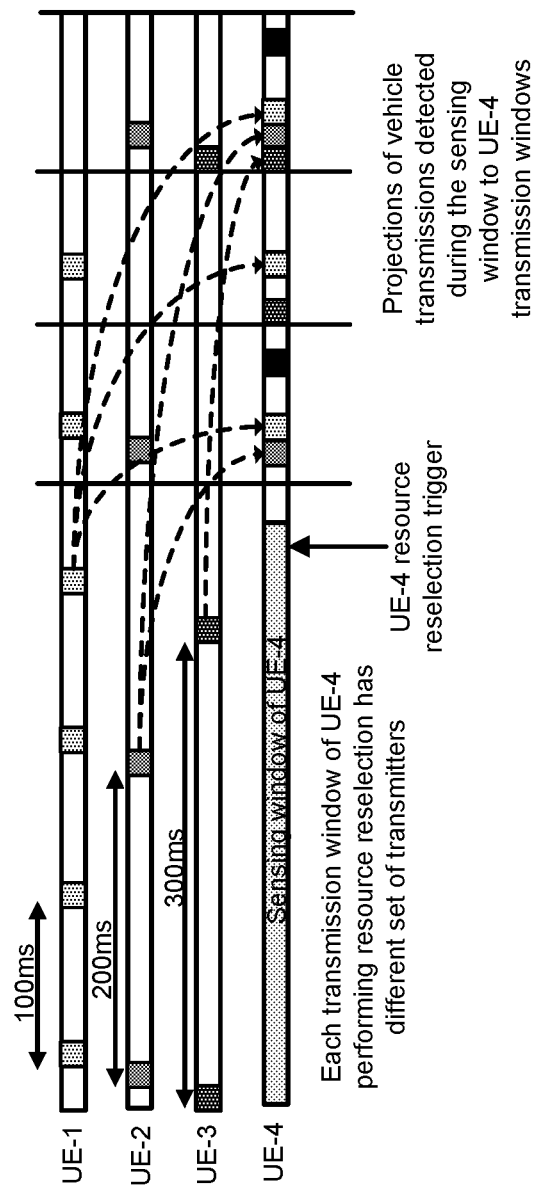
FIG. 8 is a diagram illustrating an example of the impact of different transmission periodicities, associated with different UEs, on the transmission of a particular UE.

FIG. 8 is a diagram illustrating an example of the impact of different transmission periodicities, associated with different UEs, on the transmission of a particular UE. In general, based on transmission timing information about the SPS period, which may be included in the SCI, UE 110 can project transmissions of other vehicles detected during the UE's sensing window to the subsequent UE transmission window. As shown in FIG. 8, a UE, labeled as UE-4, may detect, during its sensing window, transmissions of three other UEs, labeled as UE-1, UE-2, and UE-3. The transmissions of UE-1 may be detected to have a period of 100 ms, the transmissions of UE-2 may be detected to have a period of 200 ms, and the transmissions of UE-3 may be detected to have a period of 300 ms. Estimates of subsequent transmissions of UE-1, UE-2, and UE-3 may thus be projected into the future transmission window of UE-4. UE-4 may use the projected future transmissions in order to more intelligently select resources, during the transmission window, that minimize interference with UE-1, UE-2, and UE-3.

In the general case, in order to consider all possible combinations of active transmitters across all transmission windows of the UE performing resource reselection, information relating to transmission window duration, transmission window periodicity, and SPS resource allocation windows may need to be available. In some implementations, information about transmission window period and the SPS resource allocation window may be signaled in the SCI, while the transmission window duration can be preconfigured. Different behaviors of UEs performing resource reselection can be taken into account depending on the information available at the receiver side. A number of implementations, depending on availability of the transmission period and SPS resource allocation window, are considered in more detail below.

In a first potential implementation, consider the situation in which the actual transmission window period (of other UEs) and SPS allocation window are unknown. In this situation, the UE performing the resource reselection is not aware about the transmission windows of the other UEs that were detected with the sensing window. In this case, the UE may take a conservative approach and assume that other UEs transmit with a minimum transmission periodicity (e.g., 100 ms). The UE may accordingly additionally exclude resources, as discussed with respect to block 320 of FIG. 3, based on the assumption that the transmission window period of other detected UEs will continue to be periodically repeated with the minimum transmission period.

With respect to the operations of block 330 of FIG. 3, when the UE takes a conservative approach and assumes that the other UEs transmit with minimum transmission periodicity, the UE may process relevant parts of the sensing window corresponding to its own transmission window and average the total received energy for each resource across transmission windows. Instead of a simple averaging, the UE can apply a weighted average by emphasizing components towards the end of the sensing window or make a conservative decision by using the maximum received power level across transmission windows.

In a second potential implementation, consider the situation in which the actual transmission window period is signaled by other UEs and the SPS allocation window duration is unknown. In this situation, the UE performing the resource reselection can take the signaled transmission window periods into account when selecting resources.

With respect to the operations of block 320 (FIG. 3), given that the UE knows the transmission periods of other UEs, including its own period and SPS allocation window, the UE can separately treat the transmission window of the other UEs. In this case, the UE specific transmission periods of the other UEs may be projected to the upcoming transmission window of the UE performing resource reselection within either the SPS allocation window duration or a preconfigured time interval (e.g., one second). More particularly, in each transmission window, the UE excludes resources according to the SCI decoding information and transmitter specific RSRP measurements. Then the UE can apply the union operation to obtain the set of resources that should be excluded and use the remaining resources as candidate resources that are available for selection.

In a third potential implementation, consider the situation in which the actual transmission window period is signaled by other UEs and the SPS allocation window duration is also known. This situation is similar to the second potential implementation, as just discussed, except that the UE, based on knowledge of the SPS allocation window, can further improve upon resource reselection. For instance, when the UE excludes resources it can take into account the remaining transmission time of a given vehicle on a currently occupied resource and analyze whether it falls in at least one transmission window of the SPS allocation window period. The SPS allocation time, signaled by other UEs, can also be used by the UE to detect which other UEs have released resources and performed resource reselection within a given sensing window. This information should be taken into account in order to exclude information about transmissions that are no longer relevant.

In one implementation, the transmission periodicity and SPS allocation window may be jointly signaled in the SCI. In the operations of block 320 (FIG. 3), this information may be used in performing resource reselection by separately analyzing a set of active transmitters in the transmission window of the UE; collecting information about resources to be excluded in transmission window periods based on the transmitter specific RSRP power measurements; and combining information from all transmission windows to decide on the set of resources to be excluded from the set. In the operations of block 330 (FIG. 3), the transmission periodicity and SPS allocation window duration information may be used for performing, for each remaining resource, the averaging of total received power across multiple transmission windows (which may be projected from the sensing window). The number of transmission windows at which the averaging is applied may be configurable by eNB 125. Similarly, the averaging equation and his parameters may also be configured by eNB 125.

As used herein, the term "circuitry" or "processing circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 9:
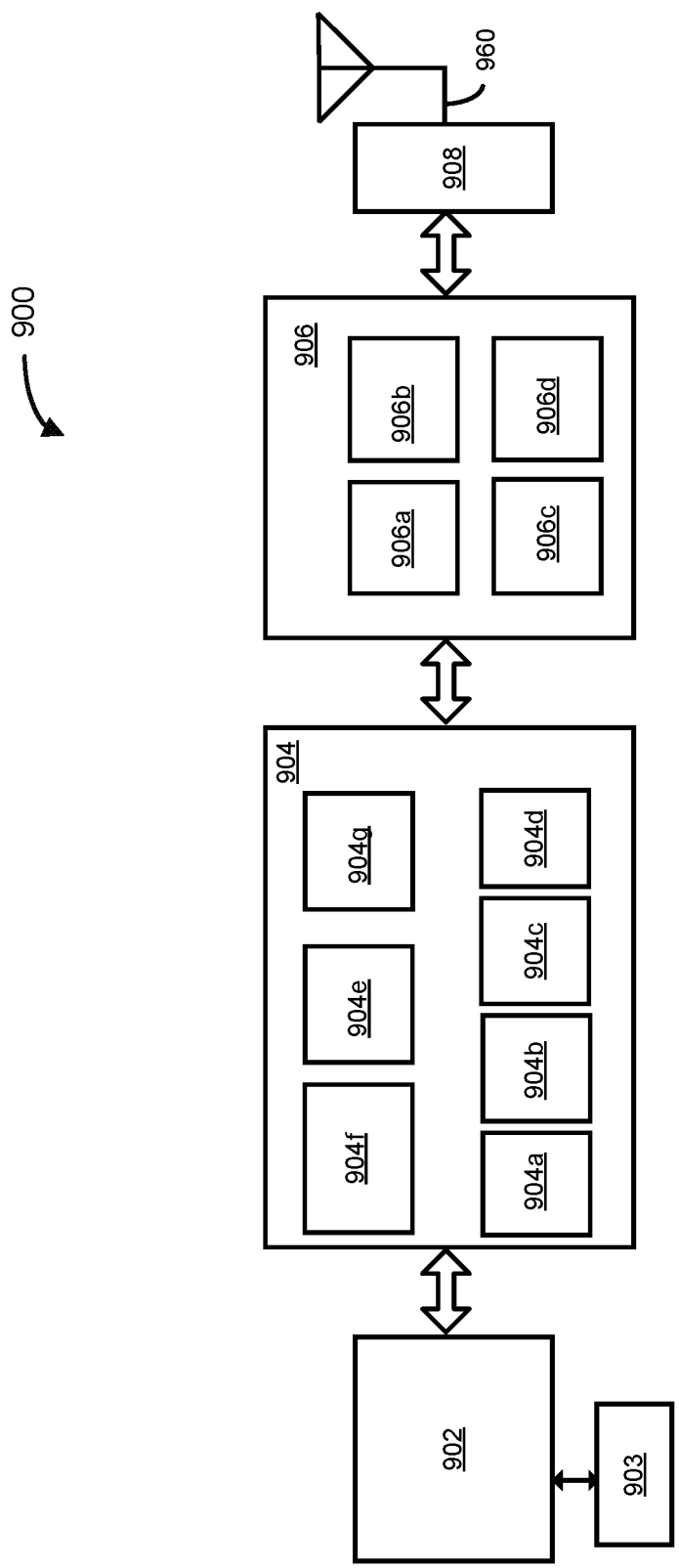
FIG. 9 illustrates, for one embodiment, example components of an electronic device.

Embodiments described herein may be implemented into a system using any suitably configured hardware and/or software. FIG. 9 illustrates, for one embodiment, example components of an electronic device 900. In embodiments, the electronic device 900 may be a mobile device, a RAN node, a network controller, a subscription repository, a data gateway, a service gateway, or an application server. In some embodiments, the electronic device 900 may include application circuitry 902, baseband circuitry 904, Radio Frequency (RF) circuitry 906, front-end module (FEM) circuitry 908 and one or more antennas 960, coupled together at least as shown. In embodiments in which a radio interface is not needed for electronic device 900 (e.g., a data gateway, network controller, etc.), the RF circuitry 906, FEM circuitry 908, and antennas 960 may be omitted. In other embodiments, any of said circuitries can be included in different devices.

Application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. The memory/storage may include, for example, computer-readable medium 903, which may be a non-transitory computer-readable medium. Application circuitry 902 may, in some embodiments, connect to or include one or more sensors, such as environmental sensors, cameras, etc.

Baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 9G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some implementations, the functionality of baseband circuitry 904 may be wholly or partially implemented by memory/storage devices configured to execute instructions stored in the memory/storage. The memory/storage may include, for example, a non-transitory computer-readable medium 904h.

In some embodiments, modulation/demodulation circuitry of the baseband circuitry 904 may include Fast-Fourier Transform (FFT), preceding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), radio resource control (RRC) elements, and/or Non-Access Stratum (NAS) elements. A central processing unit (CPU) 904e of the baseband circuitry 904 may be configured to run elements of the protocol stack for signaling of the PHY, MAC, RLC, PDCP and/or RRC layers, and/or NAS. In some embodiments, the baseband circuitry may include one or more audio digital signal processor(s) (DSP) 904f. The audio DSP(s) 904f may be include elements for compression/decompression and echo cancellation and may include other suitable processing elements in other embodiments.

Baseband circuitry 904 may further include memory/storage 904g. The memory/storage 904g may be used to load and store data and/or instructions for operations performed by the processors of the baseband circuitry 904. Memory/storage 904g may particularly include a non-transitory memory. Memory/storage for one embodiment may include any combination of suitable volatile memory and/or non-volatile memory. The memory/storage 904g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 904g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks, and direct connections with other UEs, using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission. RF circuitry may additionally include circuitry, such as filters and amplifiers, to measure and/or sense received wireless communications and to generate signals indicating the power or energy of the received wireless communications.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals.

Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+6 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+6 synthesizer.

In some embodiments, frequency input may be provided by a voltage-controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+6 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 960, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 960.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 960).

In some embodiments, the electronic device 900 may include additional elements such as, for example, memory/storage, display, camera, sensors, and/or input/output (I/O) interface. In some embodiments, the electronic device of FIG. 9 may be configured to perform one or more methods, processes, and/or techniques such as those described herein.

Figure 10:
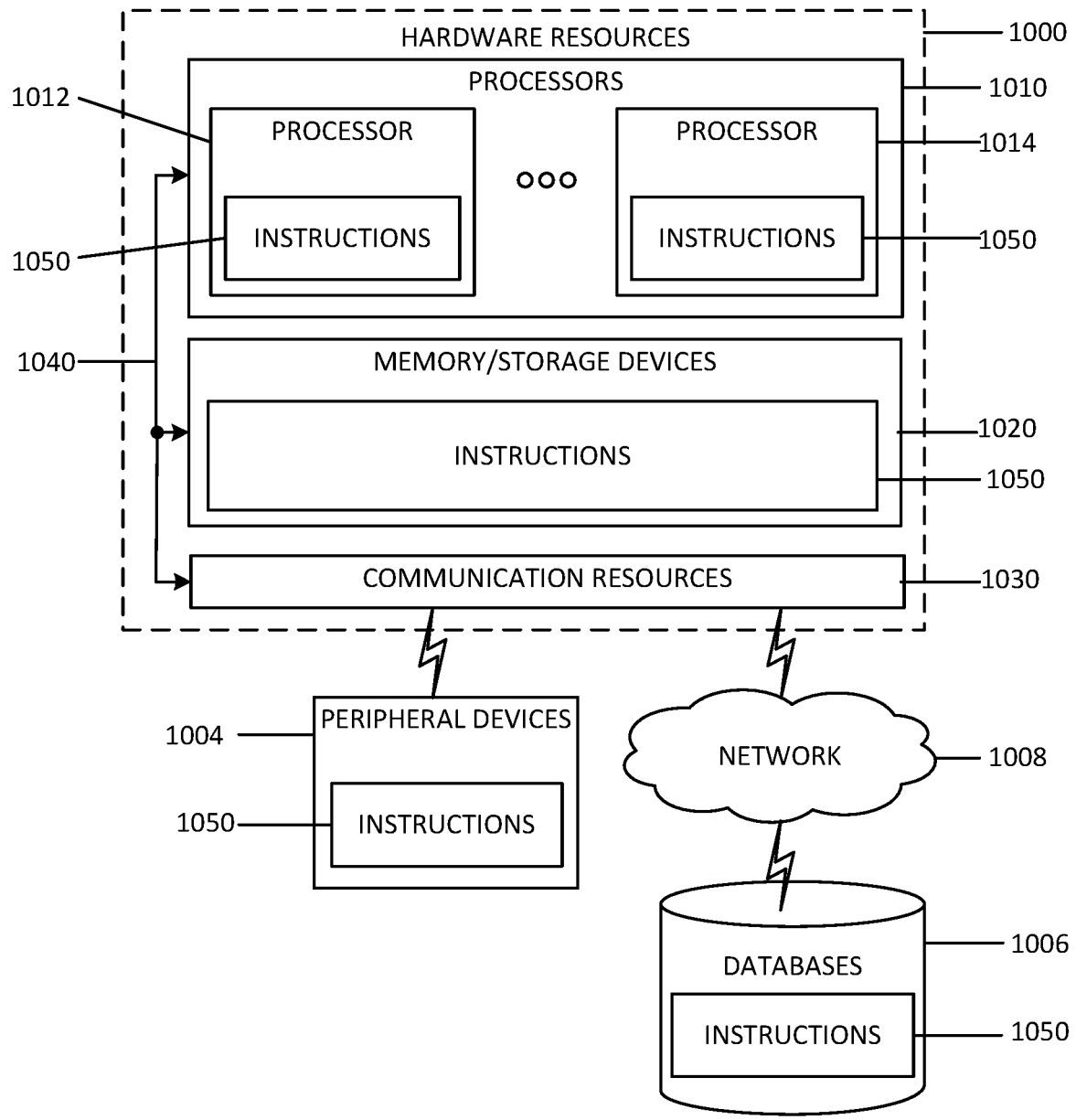
FIG. 10 is a block diagram illustrating components, according to some example embodiments, able to read instructions from a machine-readable or computer-readable medium (e.g., a machine-readable storage medium) and perform any one or more of the methodologies discussed herein.

FIG. 10 is a block diagram illustrating components, according to some example embodiments, able to read instructions from a machine-readable or computer-readable medium (e.g., a machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which are communicatively coupled via a bus 1040.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014. The memory/storage devices 1020 may include main memory, disk storage, or any suitable combination thereof.

The communication resources 1030 may include interconnection and/or network interface components or other suitable devices to communicate with one or more peripheral devices 1004 and/or one or more databases 1006 via a network 1008. For example, the communication resources 1030 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 and/or the databases 1006. Accordingly, the memory of processors 1010, the memory/storage devices 1020, the peripheral devices 1004, and the databases 1006 are examples of computer-readable and machine-readable media.

A number of examples, relating to implementations of the techniques described above, will next be given.

In a first example, an apparatus for a baseband processor of User Equipment (UE), comprising: an interface to radio frequency (RF) circuitry; and one or more baseband processors to: obtain a set of resources that are potentially available to use, by the UE, for transmissions as part of direct sidelink communications with other UEs; determine power thresholds for resources in the set of resources, the power thresholds being determined as a function of: a priority value associated with the UE; and priority values associated with other UEs that are using the resources; exclude particular resources from the set of resources based on comparisons of power values, corresponding to the particular resources and that were determined using the RF circuitry, to the determined power thresholds, to obtain a modified version of the set of resources; and communicate, via the interface to the RF circuitry and using the sidelink communications, using one or more resources selected from the set of modified resources. In example 2, the subject matter of example 1, or any of the preceding examples, wherein, when excluding the particular resources from the set of resources, the one or more baseband processors are further to: determine a number of resources in the modified set of resources; and when the determined number of resources is less than a threshold minimum number of resources, increment the power threshold values, by a predetermined amount, before reperforming the excluding based on the obtained set of resources that are potentially available to use.

In example 3, the subject matter of examples 1 or 2, or any of the preceding examples, wherein the one or more baseband processors are further to: determine, during the sensing window period, a periodicity of transmissions of the other UEs, wherein the excluding of the particular resources further includes: additionally excluding resources, from the set of resources, based on the determined periodicities, to avoid interfering transmissions between the UE and the other UEs.

In example 4, the subject matter of examples 1, 2, or 3, or any of the preceding examples, wherein the power thresholds are Reference Signal Received Power (RSRP) thresholds.

In example 5, the subject matter of examples 1, 2, or 3, or any of the preceding examples, wherein the priority values are determined on a per Semi-Persistent Scheduling (SPS) process basis.

In example 6, the subject matter of examples 1, 2, or 3 or any of the preceding examples, wherein the priority values of the other UEs are obtained from sidelink control information (SCI) transmitted by the other UEs.

In example 7, the subject matter of example 1, 2, or 3, or any of the preceding examples, wherein the processing circuitry is further to: determine the one or more resources for communicating based on a random selection from the modified set of resources.

In example 8, the subject matter of example 1, 2, or 3, or any of the preceding examples, wherein the priority value associated with the UE is obtained from higher layer processing of the UE.

In example 9, the subject matter of example 1, 2, or 3, or any of the preceding examples, wherein the function used to determine the power thresholds is based on a lookup of the power thresholds in a data structure that is indexed based on the priority value associated with the UE and the priority values associated with the other UEs.

In a tenth example, a UE may comprise: a computer-readable medium containing processing instructions; and one or more processors, to execute the processing instructions to: obtain a set of resources that are potentially available to use, by the UE, for transmissions as part of direct sidelink communications with other UEs; receive, from radio frequency (RF) circuitry of the UE, measured values of received power corresponding to resources in the set of resources; determine power thresholds for resources in the set of resources, the power thresholds being determined as a function of: a priority value associated with the UE; and priority values associated with other UEs that are using the resources; exclude particular resources from the set of resources based on comparisons of received power values, corresponding to the particular resources, to the determined power thresholds, to obtain a modified version of the set of resources; and communicate, by the UE, using the sidelink communications, using one or more resources selected from the set of modified resources.

In example 11, the subject matter of example 10, or any of the preceding examples, wherein, when excluding the particular resources from the set of resources, the processing circuitry is further to: determine a number of resources in the modified set of resources; and when the determined number of resources is less than a threshold minimum number of resources, increment the power threshold values, by a predetermined amount, before reperforming the excluding based on the obtained set of resources that are potentially available to use.

In example 12, the subject matter of example 10 or 11, or any of the preceding examples, wherein the processing circuitry is further to: determine, during the sensing window period, a periodicity of transmissions of the other UEs, wherein the excluding of the particular resources further includes: additionally excluding resources, from the set of resources, based on the determined periodicities, to avoid interfering transmissions between the UE and the other UEs.

In example 13, the subject matter of example 10, 11, or 12, or any of the preceding examples, wherein the power thresholds are Reference Signal Received Power (RSRP) thresholds.

In example 14, the subject matter of example 10, 11, or 12, or any of the preceding examples, wherein the priority values are determined on a per Semi-Persistent Scheduling (SPS) process basis.

In example 15, the subject matter of example 10, 11, or 12, or any of the preceding examples, wherein the priority values of the other UEs are obtained from sidelink control information (SCI) transmitted by the other UEs.

In example 16, the subject matter of example 10, 11, or 12, or any of the preceding examples, wherein the processing circuitry is further to: determine the one or more resources for communicating based on a random selection from the modified set of resources.

In example 17, the subject matter of example 10, 11, or 12, or any of the preceding examples, wherein the priority value associated with the UE is obtained from higher layer processing of the UE.

In example 18, the subject matter of example 10, 11, or 12, or any of the preceding examples, wherein the function used to determine the power thresholds is based on a lookup of the power thresholds in a data structure that is indexed based on the priority value associated with the UE and the priority values associated with the other UEs.

In a 19$^{th}$ example, an apparatus for a baseband processor of User Equipment (UE) comprises: a computer-readable medium containing processing instructions; and one or more processors, to execute the processing instructions to: obtain received power measurements, corresponding to potential resources that are available for use, by the UE, as part of autonomous mode Vehicle-to-Vehicle (V2V) communications; exclude particular resources from a set of resources based on comparisons of received power, corresponding to the particular resources, to the power thresholds, to obtain a modified version of the set of resources, wherein the excluding includes: determining a number of resources in the modified set of resources, and when the determined number of resources is less than a threshold minimum number of resources, incrementing the power thresholds and reperforming the excluding of the particular resources from the set of resources; and control V2V communications using resources selected from the set of modified resources.

In example 20, the subject matter of example 19, or any of the preceding examples, wherein the one or more processors are to further execute the processing instructions to: determine the power thresholds for resources in the set of resources as a function of a priority value of the UE and priority values associated with other UEs that are using the resources.

In example 21, the subject matter of example 19 or 20, or any of the preceding examples, wherein the one or more processors are to further execute the processing instructions to: determine, during the sensing window period, a periodicity of transmissions of the other UEs, wherein the excluding of the particular resources further includes: additionally excluding resources, from the set of resources, based on the determined periodicities, to avoid interfering transmissions between the UE and the other UEs.

In example 22, the subject matter of example 19 or 20, or any of the preceding examples, wherein the power thresholds are Reference Signal Received Power (RSRP) thresholds.

In example 23, the subject matter of example 9 or 20, or any of the preceding examples, wherein the priority values are determined on a per Semi-Persistent Scheduling (SPS) process basis.

In example 24, the subject matter of example 19 or 20, or any of the preceding examples, wherein the priority values of the other UEs are obtained from sidelink control information (SCI) transmitted by the other UEs.

In example 25, the subject matter of example 19 or 20, or any of the preceding examples, wherein the one or more processors are to further execute the processing instructions to: determine the one or more resources for communicating based on a random selection from the modified set of resources.

In a 26$^{th}$ example, a computer-readable medium contains program instructions for causing one or more processors to: obtain a set of spectrum resources that are potentially available to use, by the UE, for transmissions as part of the V2V communications; obtain, during a sensing window period of the V2V communications, measurements, corresponding to resources in the set of resources, of received power; determine power thresholds for resources in the set of resources, the power thresholds being determined as a function of: a priority value of the UE; and priority values associated with other UEs that are using the resources; exclude particular resources from the set of resources based on comparisons of received power, corresponding to the particular resources, to the determined power thresholds, to obtain a modified version of the set of resources; and communicate, by the UE, using direct V2V communications, using one or more resources selected from the set of modified resources.

In example 17, the subject matter of example 26, or any of the preceding examples, wherein the program instructions are further to cause the one or more processors to: determine a number of resources in the modified set of resources; and when the determined number of resources is less than a threshold minimum number of resources, increment the power thresholds before reperforming the excluding of the particular resources from the set of resources.

In example 28, the subject matter of example 26 or 27, or any of the preceding examples, wherein the program instructions are further to cause the one or more processors to: determine, during the sensing window period, a periodicity of transmissions of the other UEs, wherein the excluding of the particular resources further includes: additionally excluding resources, from the set of resources, based on the determined periodicities, to avoid interfering transmissions between the UE and the other UEs.

In example 29, the subject matter of example 26, 27, or 28, or any of the preceding examples, wherein the power thresholds are Reference Signal Received Power (RSRP) thresholds.

In example 30, the subject matter of example 26, 27, or 28, or any of the preceding examples, wherein the priority values are determined on a per Semi-Persistent Scheduling (SPS) process basis.

In example 31, the subject matter of example 26, 27, or 28, or any of the receding examples, wherein the priority values of the other UEs are obtained from sidelink control information (SCI) transmitted by the other UEs.

In example 32, the subject matter of example 26, 27, or 28, or any of the preceding examples, wherein the processing circuitry is further to: determine the one or more resources for communicating based on a random selection from the modified set of resources.

In a 33rd example, a method, performed by UE, may comprise: obtaining a set of resources that are potentially available to use, by the UE, for transmissions as part of the Vehicle-to-Vehicle (V2V) communications; obtaining, during a sensing window period of the V2V communications, measurements, corresponding to resources in the set of resources, of received power; determining power thresholds for resources in the set of resources, the power thresholds being determined as a function of: a priority value of the UE; and priority values associated with other UEs that are using the resources; excluding particular resources from the set of resources based on comparisons of received power, corresponding to the particular resources, to the determined power thresholds, to obtain a modified version of the set of resources; and communicating, by the UE, using V2V communications, using one or more resources selected from the set of modified resources.

In example 34, the subject matter of example 33, or any of the preceding examples, further comprising: determining a number of resources in the modified set of resources; and when the determined number of resources is less than a threshold minimum number of resources, incrementing the power threshold values, by a predetermined amount, before reperforming the excluding of the particular resources from the set of resources.

In example 35, the subject matter of example 33 or 34, or any of the preceding examples, further comprising: determining, during the sensing window period, a periodicity of transmissions of the other UEs, wherein the excluding of the particular resources further includes additionally excluding resources, from the set of resources, based on the determined periodicities, to avoid interfering transmissions between the UE and the other UEs.

In example 36, the subject matter of example 33, 34, or 35, or any of the preceding examples, wherein the power thresholds are Reference Signal Received Power (RSRP) thresholds.

In example 37, the subject matter of example 33, 34, or 35, or any of the preceding examples, wherein the priority values are determined on a per Semi-Persistent Scheduling (SPS) process basis.

In example 38, the subject matter of example 33, 34, or 35, or any of the preceding examples, wherein the priority values of the other UEs are obtained from sidelink control information (SCI) transmitted by the other UEs.

In example 39, the subject matter of example 33, 34, or 35, or any of the preceding examples, further comprising: determining the one or more resources for communicating based on a random selection from the modified set of resources.

In a 40th example, a UE may comprise: means for obtaining a set of spectrum resources that are potentially available to use, by the UE, for transmissions as part of the V2V communications; means for causing, during a sensing window period of the V2V communications, the RF circuitry to obtain measurements, corresponding to resources in the set of resources, of received power; means for determining power thresholds for resources in the set of resources, the power thresholds being determined as a function of: a priority value of the UE; and priority values associated with other UEs that are using the resources; means for excluding particular resources from the set of resources based on comparisons of received power, corresponding to the particular resources, to the determined power thresholds, to obtain a modified version of the set of resources; and means for communicating, by the UE, using direct V2V communications, using one or more resources selected from the set of modified resources.

In example 41, the subject matter of example 40, or any of the preceding examples, further comprising: means for determining a number of resources in the modified set of resources; and when the determined number of resources is less than a threshold minimum number of resources, increment the power threshold values, by a predetermined amount, before reperforming the excluding of the particular resources from the set of resources.

In example 42, the subject matter of example 40 or 41, or any of the preceding examples, further comprising: means for determining, during the sensing window period, a periodicity of transmissions of the other UEs, wherein the excluding of the particular resources further includes additionally excluding resources, from the set of resources, based on the determined periodicities, to avoid interfering transmissions between the UE and the other UEs.

In example 43, the subject matter of example 40 41, or any of the preceding examples, wherein the power thresholds are Reference Signal Received Power (RSRP) thresholds.

In example 44, the subject matter of example 40, 41, or 42, or any of the preceding examples, wherein the priority values are determined on a per Semi-Persistent Scheduling (SPS) process basis.

In example 45, the subject matter of example 40, 41, or 42, or any of the preceding examples, wherein the priority values of the other UEs are obtained from sidelink control information (SCI) transmitted by the other UEs.

In example 46, the subject matter of example 40, 41, or 42, or any of the preceding examples, further comprising: means for determining the one or more resources for communicating based on a random selection from the modified set of resources.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 3 and 5-7, the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus for a baseband processor of User Equipment (UE), comprising:
an interface to radio frequency (RF) circuitry; and
one or more baseband processors to:
obtain a set of resources that are potentially available to use, by the UE, for transmissions as part of direct sidelink communications with other UEs;
determine power thresholds for resources in the set of resources, the power thresholds being determined as a function of:
a priority value associated with the UE; and
priority values associated with other UEs that are using the resources;
exclude particular resources from the set of resources based on comparisons of power values, corresponding to the particular resources and that were determined using the RF circuitry, to the determined power thresholds, to obtain a modified set of resources; and
communicate, via the interface to the RF circuitry and using the sidelink communications, using one or more resources selected from the set of modified resources.

2. The apparatus of claim 1, wherein, when excluding the particular resources from the set of resources, the one or more baseband processors are further to:
determine a number of resources in the modified set of resources; and
when the determined number of resources is less than a threshold minimum number of resources, increment the power thresholds, by a predetermined amount, before reperforming the excluding based on the obtained set of resources that are potentially available to use.

3. The apparatus of claim 1, wherein the one or more baseband processors are further to:
determine, during a sensing window period, a periodicity of transmissions of the other UEs, wherein the excluding of the particular resources further includes:
additionally excluding resources, from the set of resources, based on the determined periodicities, to avoid interfering transmissions between the UE and the other UEs.

4. The apparatus of claim 1, wherein the power thresholds are Reference Signal Received Power (RSRP) thresholds.

5. The apparatus of claim 1, wherein the priority values are determined on a per Semi-Persistent Scheduling (SPS) process basis.

6. The apparatus of claim 1, wherein the priority values of the other UEs are obtained from sidelink control information (SCI) transmitted by the other UEs.

7. The apparatus of claim 1, wherein the one or more baseband processors are further to:
determine the one or more resources for communicating based on a random selection from the modified set of resources.

8. The apparatus of claim 1, wherein the priority value associated with the UE is obtained from higher layer processing of the UE.

9. The apparatus of claim 1, wherein the function used to determine the power thresholds is based on a lookup of the power thresholds in a data structure that is indexed based on the priority value associated with the UE and the priority values associated with the other UEs.

10. User Equipment (UE) comprising:
a computer-readable medium containing processing instructions; and
one or more processors, to execute the processing instructions to:
obtain a set of resources that are potentially available to use, by the UE, for transmissions as part of direct sidelink communications with other UEs;
determine power thresholds for resources in the set of resources, the power thresholds being determined as a function of:
a priority value associated with the UE; and
priority values associated with other UEs that are using the resources;
exclude particular resources from the set of resources based on comparisons of power values, corresponding to the particular resources and measured by the UE, to the determined power thresholds, to obtain a modified version of the set of resources; and
communicate, by the UE, using the sidelink communications, using one or more resources selected from the set of modified resources.

11. The UE of claim 10, wherein, when excluding the particular resources from the set of resources, the one or more baseband processors are further to:
determine a number of resources in the modified set of resources; and
when the determined number of resources is less than a threshold minimum number of resources, increment the power threshold values, by a predetermined amount, before reperforming the excluding based on the obtained set of resources that are potentially available to use.

12. The UE of claim 10, wherein the one or more baseband processors are further to:
determine, during a sensing window period, a periodicity of transmissions of the other UEs, wherein the excluding of the particular resources further includes:
additionally excluding resources, from the set of resources, based on the determined periodicities, to avoid interfering transmissions between the UE and the other UEs.

13. The UE of claim 10, wherein the power thresholds are Reference Signal Received Power (RSRP) thresholds.

14. The UE of claim 10, wherein the priority values are determined on a per Semi-Persistent Scheduling (SPS) process basis.

15. The UE of claim 10, wherein the priority values of the other UEs are obtained from sidelink control information (SCI) transmitted by the other UEs.

16. The UE of claim 10, wherein the one or more baseband processors are further to:
determine the one or more resources for communicating based on a random selection from the modified set of resources.

17. The UE of claim 10, wherein the priority value associated with the UE is obtained from higher layer processing of the UE.

18. The UE of claim 10, wherein the function used to determine the power thresholds is based on a lookup of the power thresholds in a data structure that is indexed based on the priority value associated with the UE and the priority values associated with the other UEs.

19. An apparatus for a baseband processor of User Equipment (UE), comprising:
a computer-readable medium containing processing instructions; and
one or more processors, to execute the processing instructions to:
obtain received power measurements, corresponding to potential resources that are available for use, by the UE, as part of autonomous mode Vehicle-to-Vehicle (V2V) communications;
exclude particular resources from a set of resources based on comparisons of received power, corresponding to the particular resources, to power thresholds, to obtain a modified set of resources, wherein the excluding includes:
determining a number of resources in the modified set of resources, and
when the determined number of resources is less than a threshold minimum number of resources, incrementing the power thresholds and reperforming the excluding of the particular resources from the set of resources; and
control V2V communications using resources selected from the set of modified resources.

20. The apparatus of claim 19, wherein the one or more processors are to further execute the processing instructions to:
determine the power thresholds for resources in the set of resources as a function of a priority value of the UE and priority values associated with other UEs that are using the resources.

21. The apparatus of claim 19, wherein the one or more processors are to further execute the processing instructions to:
determine, during a sensing window period, a periodicity of transmissions of other UEs, wherein the excluding of the particular resources further includes:
additionally excluding resources, from the set of resources, based on the determined periodicities, to avoid interfering transmissions between the UE and the other UEs.

22. The apparatus of claim 19, wherein the power thresholds are Reference Signal Received Power (RSRP) thresholds.

* * * * *